United States Patent

[11] 3,619,137

| [72] | Inventor | Eric G. Ratcliffe<br>Easton, Pa. |
| --- | --- | --- |
| [21] | Appl. No. | 791,774 |
| [22] | Filed | Jan. 16, 1969 |
| [45] | Patented | Nov. 9, 1971 |
| [73] | Assignee | Pfizer Inc.<br>New York, N.Y. |

[54] PRODUCTION OF IRON OXIDE PIGMENTS
7 Claims, No Drawings

[52] U.S. Cl. .................................................. 23/200,
23/305, 75/108
[51] Int. Cl. ........................................ C01g 49/02,
C22b 3/00
[50] Field of Search ............................. 23/200,
305, 145; 75/108

[56] References Cited
UNITED STATES PATENTS

| 1,636,296 | 7/1927 | Elliott .......................... | 23/200 X |
| --- | --- | --- | --- |
| 1,824,936 | 9/1931 | Travers ....................... | 23/200 |
| 2,388,659 | 11/1945 | Ryan et al. .................. | 23/200 |
| 2,696,426 | 12/1954 | Marcot ........................ | 23/200 |
| 2,822,243 | 2/1958 | Brix ............................. | 23/145 |
| 3,539,337 | 11/1970 | Stanimirovitch et al. ..... | 23/200 X |

*Primary Examiner*—Oscar R. Vertiz
*Assistant Examiner*—G. Alvaro
*Attorney*—Connolly and Hutz

ABSTRACT: Pigment-grade ferric oxide is precipitated from a solution of a ferrous salt by aerating at ambient temperature while introducing substantially two equivalents of base at such rate as to maintain the pH between 5 and 6.

PRODUCTION OF IRON OXIDE PIGMENTS

BACKGROUND OF THE INVENTION

This invention relates to the production of iron oxide pigments, especially sienna-type pigments, by precipitation from solutions of ferrous salts.

Hydrated iron oxide pigments, essentially ferric oxide monohydrate, vary in color from lemon yellow to dark brown; they also vary considerably in hiding power, tinting strength and tint tone. Natural sienna owes its brownish-yellow color to oxides of iron.

Hydrated iron oxide pigments have been prepared by precipitation from iron salt solutions with alkaline reagents and aeration prior to my invention, but insofar as I am aware, products comparable in uniformity, tinting strength, cleanliness of tint, fineness of particle size, and resemblance to natural sienna have not been prepared by such precipitation methods.

Prior processes have included such features as precipitation at elevated temperature, addition of an excess or a deficiency of base, precipitation in the presence of ferric oxide seed, and prior precipitation as ferrous hydroxide followed by oxidation.

SUMMARY OF THE INVENTION

The present invention embodies a process whereby superior iron oxide pigments including sienna-type pigments are prepared without the need for seeding or heat, by precipitating hydrated ferric oxide from a solution of a ferrous salt under carefully controlled conditions of pH. The solution is aerated at ambient temperature while introducing substantially two equivalents of base at such rate as to maintain the pH between about 5 and 6 until precipitation is substantially complete. The resulting pigments are much finer in particle size than the products of prior processes and they possess the additional advantages described above.

DETAILED DESCRIPTION OF THE INVENTION

The preferred source of iron in my process is copperas ($FeSO_4 \cdot 7H_2O$) which is a waste byproduct, available in large quantities. Other salts of iron such as ferrous chloride, ferrous sulfate, or mixtures of these salts may, however, be used, and are entirely suitable.

A preferred initial range of ferrous salt concentration in water is from about 0.2 to 0.4 lb./gal. The tinting strength of the final iron oxide pigment becomes increasingly weaker with increasing concentrations of ferrous salt above 0.4 lb./gal.

No seeding is required. Oxygen, conveniently in the form of air, is introduced to the ferrous salt solution while maintaining the pH between about 5 and 6, and preferably between 5 and 5.5. The pH control is effected by addition of alkaline reagent as required during the aeration. Whereas any base can by employed, it is preferred to employ a carbonate salt, for example, sodium carbonate, sodium bicarbonate, potassium carbonate, magnesium carbonate, lithium carbonate, or mixtures of these materials. Calcium carbonate or limestone can be used, but preferably not with ferrous sulfate, to avoid coprecipitation of insoluble calcium sulfate with the product. Approximately two equivalents of base will be required, e.g. an equimolar proportion in the case of sodium carbonate; 2 moles in the case of sodium bicarbonate.

During the precipitation, ambient temperatures are employed, e.g. from about 50° to 100° F. Temperatures between about 70° F. to 85° F. are preferred, especially about 80° F. At temperatures under 70° F., there is some loss of cleanliness of tint of the final product, and at temperatures above 85° F., there may be difficulty in filtering the precipitate. The new process is thus distinguished from prior art processes which require heating to temperatures as high as the boiling point.

With addition of base the pH of the reaction first rises to perhaps as high as 6 and then drops rapidly to about 5–5.3. Under these conditions no appreciable ferrous iron precipitates as such. At the end of the reaction, when the ferrous salt is consumed, the pH rises again. The high initial rise in pH is not significant, but at other times the pH should be under 5.5, to avoid precipitation of manganese. Copperas often contains about 0.2 percent manganese which will, for the most part, remain in solution if the pH is under 5.5. If the final pH rises over 5.5 a dirty color may result from precipitation of black manganese dioxide.

The precipitated ferric oxide may be recovered by filtration or other conventional method and water-washed to remove water-soluble salts. Sulfur, if present in excessive amounts, e.g. 2–3 percent, may be reduced to tolerable levels, e.g. ½–¾ percent or less, by further washing with water adjusted to about pH 9, with sodium hydroxide, for example.

The dried product closely resembles raw sienna, and may be employed as a pigment without further treatment. The greater demand for burnt siennas, however, will usually dictate calcining of the product.

The color obtained in calcining the ferric oxide produced by this process is dependent to some degree on temperature. Calcining temperatures of about 800°–1500° F. may be employed, but temperatures of about 900°–1100° F. give rise to a product that most closely matches the color and properties of burnt sienna. The higher temperatures provide a light red iron oxide.

The following examples are merely illustrative and are not intended to limit the invention, the scope of which is defined by the appended claims.

EXAMPLE I

To 10,000 gallons of an aqueous solution containing 2000 pounds of anhydrous ferrous sulfate at 75°–85° F. are added 1400 pounds of sodium carbonate over a 1 to 2 hour period, at such rate that the pH of the solution is maintained between 5.0 and 5.5. Simultaneously, air is introduced at the rate of about 1300 cubic feet per minute. The resulting precipitate is filtered, washed substantially free of water-soluble salts, slurried with a sodium hydroxide solution at about pH 9, and again washed with water. The precipitate is calcined in a rotary kiln at a temperature range of 900°–1100° F. The pulverized calcined material closely matches the color of burnt sienna. Electron micrographs disclose that it is characterized by an unusually fine particle size.

EXAMPLE II

To 10,000 gallons of a solution containing 3900 pounds of commercial ferrous sulfate ($FeSO_4 \cdot 7H_2O$), are added 1500 pounds of sodium carbonate over a 1 to 2 hour period at 70°F., while continuously stirring to maintain the pH between 5.0 and 5.5. Simultaneously, air is introduced at the rate of about 1100 cubic feet per minute. The precipitated hydrated ferric oxide is filtered, washed with water, slurried with sodium hydroxide solution at about pH 9, and again washed with water. A dried and pulverized sample of the product closely approximates the color of natural sienna. The remainder of the product is calcined in a rotary kiln at about 1000° F. The color of the calcined product is that of burnt sienna.

EXAMPLE III

The process of example II is repeated with ferrous chloride in place of ferrous sulfate at a concentration of 0.4 pounds per gallon, and the equivalent proportion of a calcium carbonate slurry in place of sodium carbonate, with comparable results.

We claim:

1. In a process for the preparation of hydrated ferric oxide pigment by precipitation from an aqueous ferrous salt solution with alkaline reagent and aeration, the improvement which consists essentially of conducting the reaction at ambient temperature with aeration while introducing substantially two equivalents of said alkaline reagent to said solution at such rate as to maintain the pH of said solution between about 5 and 6 until precipitation of said oxide is substantially complete, and recovering said precipitate.

2. The process of claim 1 wherein said temperature is between about 70° F. and 85° F.

3. The process of claim 1 wherein said pH is maintained below about 5.5.

4. The process of claim 1 where said alkaline reagent is a sodium, potassium, magnesium or lithium carbonate salt, or mixtures of these.

5. The process of claim 1 wherein said ferrous salt is copperas.

6. The process of claim 1 wherein said ferrous salt is present in a concentration of up to about 0.4 lb. per gallon.

7. The process of claim 6 wherein said concentration is at least about 0.2 lb. per gallon.

* * * * *